(12) United States Patent
Romier et al.

(10) Patent No.: US 7,552,022 B2
(45) Date of Patent: Jun. 23, 2009

(54) METHOD AND ARRANGEMENT FOR TEMPERATURE CALIBRATION

(75) Inventors: Sacha Romier, Zürich (CH); Patrick Oelhafen, Knonau (CH)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 10/562,101

(22) PCT Filed: Jun. 22, 2004

(86) PCT No.: PCT/IB2004/050957
§ 371 (c)(1),
(2), (4) Date: Mar. 13, 2007

(87) PCT Pub. No.: WO2005/001405
PCT Pub. Date: Jan. 6, 2005

(65) Prior Publication Data
US 2007/0195858 A1    Aug. 23, 2007

(30) Foreign Application Priority Data
Jun. 27, 2003 (EP) .................................. 03101916

(51) Int. Cl.
*G01K 15/00* (2006.01)
*G06F 11/30* (2006.01)

(52) U.S. Cl. .................. 702/99; 702/130; 702/182; 702/183; 324/765; 374/172
(58) Field of Classification Search .............. 702/32–34, 702/99, 86, 100–107, 116–126, 182–185; 374/172; 324/765
See application file for complete search history.

(56) References Cited

U.S. PATENT DOCUMENTS 6,183,131 B1 *  2/2001  Holloway et al. ............ 374/172

* cited by examiner

*Primary Examiner*—Eliseo Ramos Feliciano
*Assistant Examiner*—Phuong Huynh

(57) ABSTRACT

The invention concerns an arrangement on a semiconductor chip for calibrating temperature setting curve having a signal generation unit (2) for providing a first signal ($I_{ptat1}$, $V_{ptat1}$, $f_{ptat1}$), which is proportional to the actual uncalibrated temperature $T_1$ of the chip. To avoid bringing the chip on a second temperature it is proposed to read a first signal ($I_{ptat1}$, $V_{ptat1}$, $f_{ptat1}$), which is proportional to the actual uncalibrated temperature T1 of the chip and generate a signal offset ($I_{virt}$, $V_{virt}$, $f_{virt}$), which is combined with the first signal ($I_{ptat1}$, $V_{ptat1}$, $f_{ptat1}$) defining a second signal ($I_{ptat2}$, $V_{ptat2}$, $f_{ptat2}$) and to extract a first actual temperature $T_1$ from the first signal ($I_{ptat1}$, $V_{ptat1}$, $f_{ptat1}$) and a second uncalibrated temperature $T_2$ from the second signal ($I_{ptat2}$, $V_{ptat2}$, $f_{ptat2}$).

11 Claims, 3 Drawing Sheets

METHOD AND ARRANGEMENT FOR TEMPERATURE CALIBRATION

The invention concerns a method for calibrating a temperature setting curve on a semiconductor chip, further it relates to an arrangement for calibrating the temperature setting curve.

For adjusting appropriate parameters of a chip a reliable temperature value is needed. This temperature value is extracted from a characteristic signal and a temperature setting curve for the semiconductor chip.

Having the exact temperature of the chip is very important, because a lot of parameters for operating the chip are related to the actual temperature, so the parameters are adapted to the actual temperature value if the temperature is vacillating. For example, for driving a display arrangement certain voltages are necessary. The supplied voltage values are dependent on the chip temperature, which is different under certain circumstances and environmental conditions. So the actual temperature of the chip is measured for adapting the required voltages.

One possibility to calibrate the temperature curve of the sensor is to calibrate only the offset or the slope of the curve. The disadvantage of this approach is that the temperature readout is only accurate at one temperature point (the calibration point). If the slope of the temperature setting curve is not accurate, the measured temperature will have a mismatch with the actual temperature. To get an accurate result of the measurement, the slope must be calibrated as well.

It is known to calibrate a temperature setting curve of a chip by using two temperature points. To get these temperature points, the chip or device has to be brought to two different temperatures. Bringing the chip on two different temperatures requires a lot time, which is longer than the overall testing time.

So it is an object of the invention to provide a method and an arrangement for calibrating the temperature setting curve on a semiconductor chip in a very short time, by maintaining the required accuracy.

The object is solved by the features of the independent claims.

The solution is based on the thought, that the temperature extracting unit could be misleaded. To achieve this misleading a signal generation unit is provided, which is able to generate a first signal and a signal offset. A first temperature point is obtained, by reading the first signal, which is proportional to the temperature. To get a second temperature point the signal generation unit generates a signal offset which is combined with the first signal, so the extraction unit reads a second signal, which corresponds to a second temperature, whereby this second temperature does not exist on the chip, since it is only virtually.

Thus the temperature extracting unit can calculate two temperature points, the first temperature point based on the first signal, which is proportional to the first actual temperature and the second temperature point based on the second signal which is a combination of the first signal and the signal offset. This second signal is proportional to a second temperature point or a so called virtual temperature point. By knowing these two temperature points it is possible to calculate the slope and the course of the real temperature curve of the particular chip. Out of this knowledge calibration values can be calculated to get a very accurate temperature curve.

This type of temperature calibration can be used in any on-chip temperature sensors.

One aspect of the present invention regards a signal generation unit which generates a current signal $I_{ptat1}$. This first current signal $I_{ptat1}$ is supplied to the temperature extraction unit, wherein the first temperature point $T_1$ is calculated. The operation of the signal generation unit is then switched to the second current signal $I_{ptat2}$, so a current offset $I_{virt}$ is generated and combined with the first current signal $I_{ptat1}$. This resulting second current signal $I_{ptat2}$ is supplied to the temperature extraction unit, which calculates the second temperature point $T_2$ and further calibrates the temperature setting curve. A current based architecture is easy to realize, thereby providing high accuracy, whereas only a small chip area is required.

A further aspect of the present invention regards an embodiment, wherein the first signal is realized as a voltage $V_{ptat}$, to be supplied to the temperature extraction unit. For calibrating the chip a voltage offset $V_{virt}$ is generated by the signal generation unit and combined with the first voltage $V_{ptat1}$. This resulting second voltage $V_{ptat2}$ is supplied to the temperature extraction unit, wherein the second or virtual temperature point $T_2$ is calculated, facilitating the calibration of the temperature setting curve. Depending of the signal extraction unit and the reference signal it can be an advantage to use a voltage based architecture. But it is easier to combine currents than voltages keeping the best possible accuracy.

A further aspect of the present invention regards an embodiment, wherein the first signal is realized as a frequency $f_{ptat}$, which is proportional to the temperature. The calculation of the second temperature point $T_2$ is performed similar to the first and second above mentioned embodiments. The using of a frequency can be advantageous, if the available reference signal is a frequency, however using a frequency is more difficult than combining voltage or current signals.

The object of the invention is also solved by a method for calibrating a temperature setting curve of a temperature sensor arrangement on a semiconductor chip, the method comprising:

reading a first signal ($I_{ptat1}$, $V_{ptat1}$, $f_{ptat1}$), which is proportional to the actual temperature $T_1$ of the chip generating a signal offset ($I_{virt}$, $V_{virt}$, $f_{virt}$), which is combined with the first signal ($I_{ptat1}$, $V_{ptat1}$, $f_{ptat1}$) defining a second signal ($I_{ptat2}$, $V_{ptat2}$, $f_{ptat2}$)

extracting a first actual temperature $T_1$ from the first signal ($I_{ptat1}$, $V_{ptat1}$, $f_{ptat1}$) and a second temperature $T_2$ from the second signal ($I_{ptat2}$, $V_{ptat2}$, $f_{ptat2}$)

In a further embodiment of the resulting temperatures ($T_1$, $T_2$) are used for providing calibration parameters to the chip.

Further it is possible to calculate the calibration parameters on-chip or off-chip depending on the application.

Further it is possible that additional signal offsets ($I_{virt2}$, $V_{virt2}$, $f_{virt2}$) are provided for calculating more than two temperature points $T_n$, so a non linear temperature setting curve can be calibrated.

In a further embodiment the signal offset ($I_{virt}$, $V_{virt}$, $f_{virt}$) is subtracted from first signal ($I_{ptat1}$, $V_{ptat1}$, $f_{ptat1}$) or added to the first signal ($I_{ptat1}$, $V_{ptat1}$, $f_{ptat1}$) defining the second signal ($I_{ptat2}$, $V_{ptat2}$, $f_{ptat2}$) which is provided to the temperature extraction unit (3).

In order that the invention may be well understood, there will now be described some embodiments thereof, given by way of example, references being made to the accompanying drawings, in which.

Figure 1:
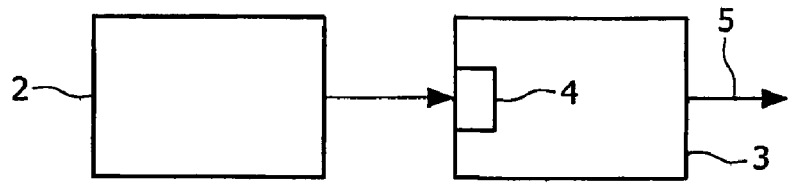
FIG. 1 shows a block diagram of an on chip temperature sensor.

FIG. 1 shows a block diagram of an on chip temperature sensor according to the present invention. The signal generation unit 2 generates a first signal, which is proportional to the temperature. This first signal is supplied to the temperature extraction unit 3 for calculating a first temperature point. Further the signal generation unit 2 generates during the calibration procedure a signal offset, which is combined to the first signal defining the second signal. By supplying the second signal to the temperature extraction unit 3 the temperature extraction unit 3 will be misleaded. The temperature extraction unit 3 calculates a second temperature point without heating the chip on a second temperature.

The signals supplied to the temperature extraction unit 3 are converted, e.g. in AD-converter 4 and the temperature extraction unit 3 calculates the actual temperature out of the supplied signal in a digital manner, by using schemes, which are implemented. These schemes are programmed and based on formulas, which will be explained in more detail below.

By this way the calibration of the temperature setting curve is performed in a very short time, e.g. during testing procedure only by having a single temperature point. The effort in particularly the chip area for generating the signal offset in the signal generation unit 2 is very low.

Figure 2:
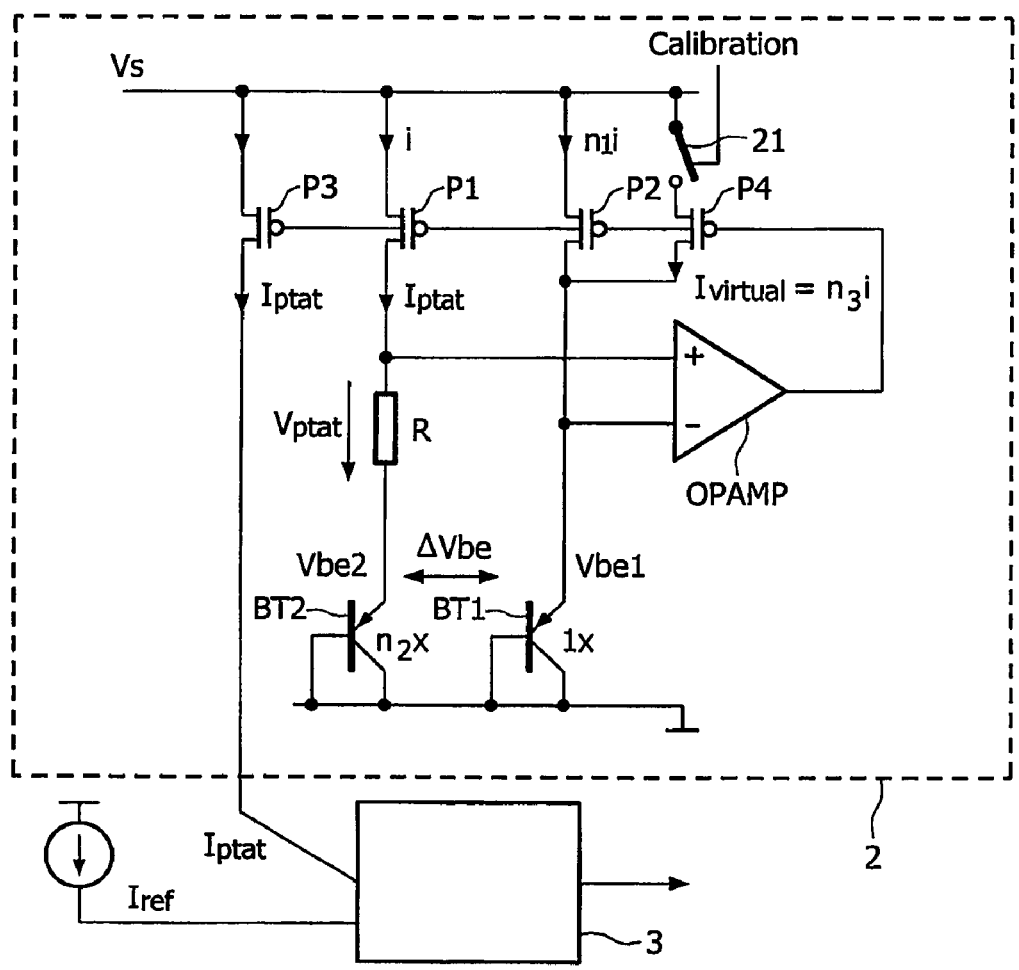
FIG. 2 shows a first embodiment of a signal generation unit according to the present invention.

FIG. 2 shows a first embodiment according to the present invention. Here the first signal is realized as a current signal $I_{ptat1}$ if the switch 21 is open. During the calibration procedure a first current $I_{ptat1}$ is supplied to the temperature extraction unit 3, calculating a first temperature point $T_1$. This temperature value $T_1$ corresponds to the real and uncalibrated chip temperature. After calculating this temperature value $T_1$ the switch 21 is closed and the second current $I_{ptat2}$ is generated. After the switch 21 is closed a voltage $\Delta Vbe_2$ appears between the two bipolar transistors BT1 und BT2. This voltage $\Delta Vbe_2$ will be converted in a current $I_{ptat2}$ that is corresponding to the virtual and uncalibrated temperature $T_2$.

In the following the functionality of the bandgap circuitry will be shortly described. The OPAMP sets the voltages of the PMOS transistors P1-P4 gates in such a way that the difference between the two OPAMP-inputs is regulated to zero.

In the following the formulas for calculating the respective temperature points are discussed.

At temperature $T_{test}$: $\Delta vbe_{Ttest} = Vbe1 - Vbe2 = (kT/q)\ln(n_1 \ast n_2)|T = T_{test}$ (1)

Formula (1) is for calculating the first temperature point, whereas, $\Delta vbe_{Ttest}$ = Voltage between BT1 und BT2 during first temperature $T_{test}$ Vbe1 = Basis emitter voltage BT1

Vbe2 = Basis emitter voltage BT2 k = Bolzmann constant

T = absolute Temperature (K)

q = charge of an electron $n_1$, $n_2$, $n_3$ = multiplication factors, how many unity transistors are connected in parallel x = variable depending on parameters like accuracy, size of circuitry etc.

The multiplication factors $n_1$, $n_2$, $n_3$ are selected in dependency on the required accuracy and the available chip area and the current consumption. The advantage of having a high value for the multiplication factor $n_2$ is a high $\Delta vbe$ leading to a good precision. However a high $n_2$ requires a lot of chip area for realizing of the bipolar transistor BT2. The advantage of having a high value for the multiplication factor $n_1$ is a high $\Delta vbe$ leading also to a good precision. The high current consumption is disadvantageous in that case, further it requires a slightly more chip area. But selecting $n_1$ too big will result in lower precision due to the mismatch of the current mirror. Taking a high value for the multiplication factor $n_3$ will lead to a higher precision, because the two temperature points are more separated, so the signal offset is higher. The drawback is an increased chip area and a higher current consumption during the calibration. A good compromise for accuracy, chip area and current consumption will be achieved with $n_1=10$, $n_2=24$, $n_3=17$.

The formula (2) is used for calculating the second temperature point $T_2$ (switch 21 closed).

For T at temperature $T_{test}$:

$\Delta vbe_2 = Vbe1 - Vbe2 = (k \ast T/q) \ast \ln((n_1+n_3) \ast n_2)|T = T_{test}$ (2)

Using formula (1) and formula (2) the virtual temperature $T_2$ can be calculated with formula (3)

$T_2 = T_{test} \ast \ln((n1+n3) \ast n2)/\ln(n1 \ast n2)$ (3)

The current signal, which is proportional to the temperature is measured and based on the physical rule $I_{ptat} = \Delta vbe/R$ (4)

Figure 3:
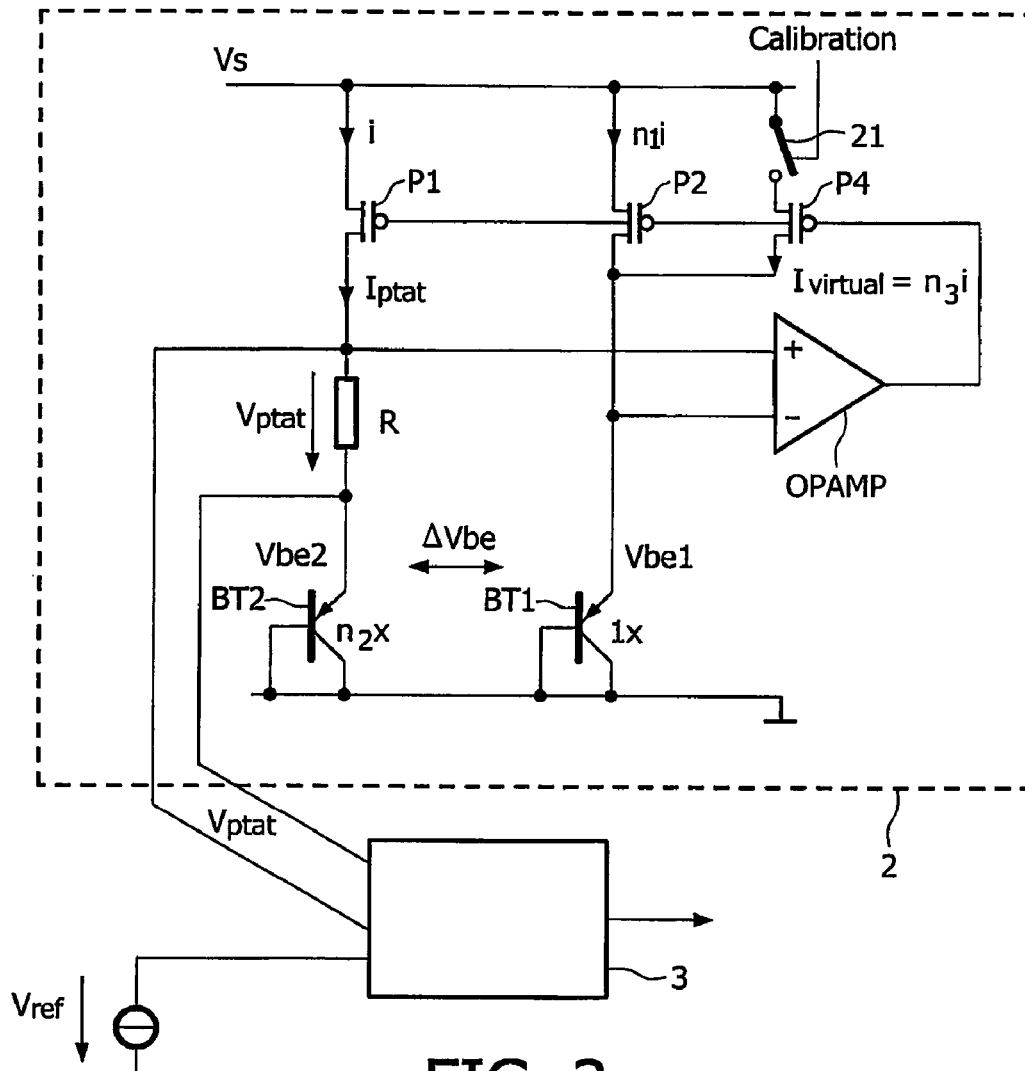
FIG. 3 shows an alternative embodiment of a signal generation unit according to the present invention.

FIG. 3 shows an alternative embodiment according the present invention.

In this embodiment a first voltage $V_{ptat1}$ is generated and supplied to the temperature extraction unit 3. For generating a second voltage or a virtual voltage the switch 21 is closed and the $V_{ptat2}$ is supplied to the temperature extraction unit 3 which corresponds to $T_2$.

By using this architecture a virtual temperature point can be generated. With this virtual temperature point $T_2$ and the $T_{test}$ point it is possible to calculate the slope of the uncalibrated temperature curve, thereby making the calibration possible during chip testing at one single temperature, which saves time.

Figure 4:
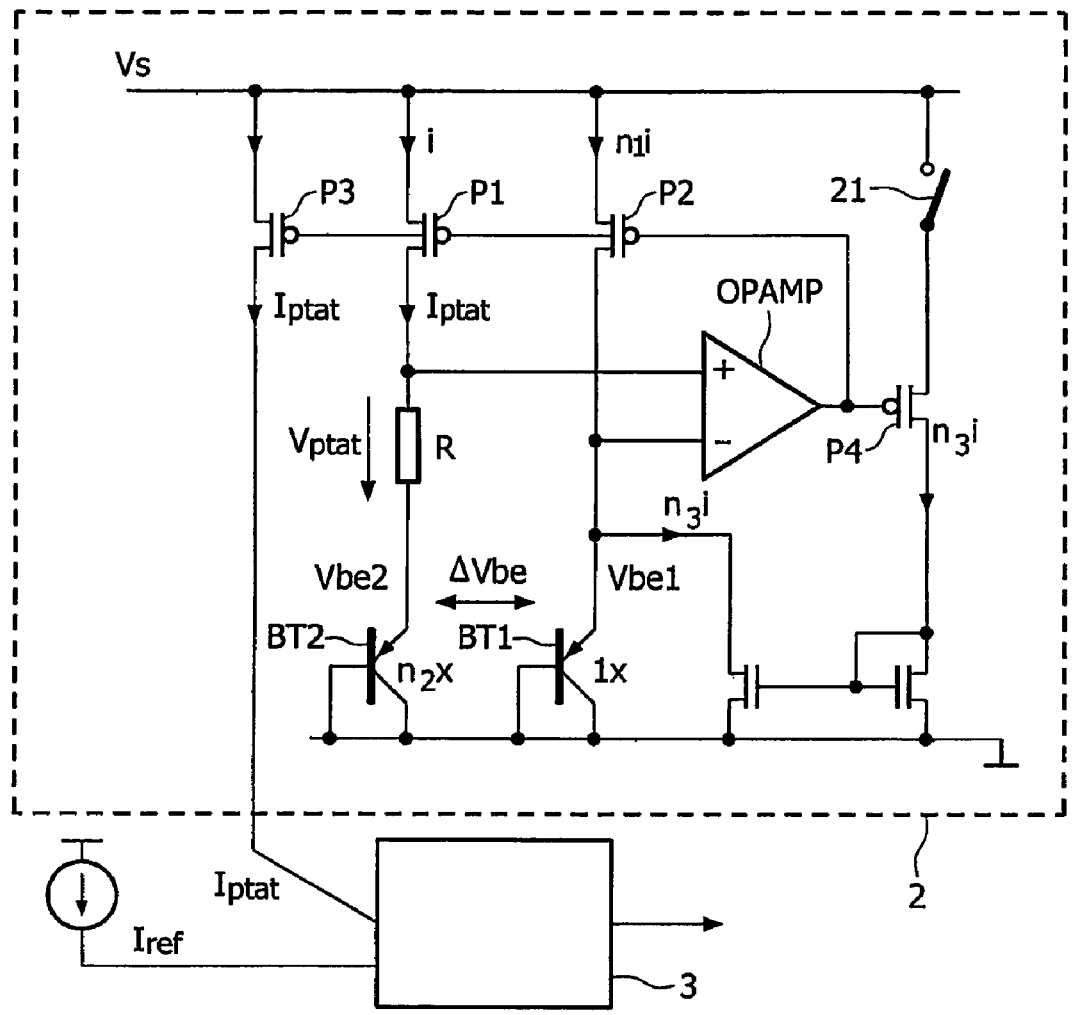
FIG. 4 shows an alternative embodiment for signal generation unit in accordance with the present invention.

A further embodiment for signal a generation unit 2 for generating a virtual temperature is shown in FIG. 4. In this embodiment the current $I_{ptat2}$ is subtracted by closing the switch 21. Thereby the second temperature $T_2$ will be below $T_1$. There are no changes required in the temperature extraction unit 3. Following formulas corresponds to FIG. 4:

For $T_2$ at temperature $T_{test}$: $\Delta vbe_2 = Vbe1 - Vbe2 = (k \ast T/q) \ast \ln((n_1-n_3) \ast n_2)|T = T_{test}$ (4)

Using Formula (1) and formula (4) the virtual temperature $T_2$ can be calculated with formula (5)

$T_2 = T_{test} \ast \ln((n_1-n_3) \ast n_2)/\ln(n_1 \ast n_2)$

This embodiment is advantageous because $T_2$ is smaller than $T_{Test}$. Since the temperature $T_{Test}$ during the test procedure is typically 85 degrees, a smaller $T_2$ than $T_{Test}$ will make the behaviour of the system closer to normal operation mode. However the current copy through the current mirrors introduces additional error leading to a less precise calibration.

The invention claimed is:

1. Arrangement on a semiconductor chip for calibrating a temperature setting curve having a signal generation unit for providing a first signal, which is proportional to an actual temperature of the chip, whereby a signal offset is creatable by the signal generation unit, which is combined with the first signal to define a second signal; and a temperature extraction unit receiving the first signal and the second signal for calculating a first temperature point based on the first signal and for calculating a second temperature point based on the second signal, wherein the second temperature point is a virtual temperature point and wherein the first and second temperature points are different from each other, wherein the second temperature point does not exist in the semiconductor chip during calibration of the temperature setting curve.

2. Arrangement as claimed in claim 1, whereby the first signal, which is proportional to the actual temperature of the chip, is a current, a voltage or a frequency.

3. Arrangement as claimed in claim 1, whereby the first signal and the second signal are convertible into digital signals, whereby the temperature extraction unit calculates the first and second temperature points for calibrating the temperature setting curve.

4. Method as claimed in claim 1, whereby the signal offset is subtracted from the first signal or added to the first signal defining the second signal, which is provided to the temperature extraction unit.

5. The arrangement as claimed in claim 1 wherein the temperature extraction unit calibrates a temperature setting curve using the first temperature point and the second virtual temperature point, both of which are a function of the actual temperature.

6. The arrangement as claimed in claim 1 wherein the temperature setting curve is calibrated using only a single actual temperature point, where the single actual temperature point represents an actual temperature of the chip.

7. Method for calibrating a temperature setting curve of a temperature sensor arrangement on a semiconductor chip, the method comprising:

reading a first signal, which is proportional to an actual temperature of the semiconductor chip;

generating a signal offset, which is combined with the first signal to define a second signal;

extracting a first actual temperature from the first signal and a second virtual temperature from the second signal, wherein the first actual temperature and the second virtual temperature are different from each other and wherein the second virtual temperature does not exist on the semiconductor chip during calibration of the temperature setting curve; and calibrating a temperature setting curve of the semiconductor chip using the first actual temperature and the second virtual temperature.

8. Method as claimed in claim 7, whereby the first actual temperature and the second virtual temperature are used for providing calibration parameters to the semiconductor chip.

9. Method as claimed in claim 8, whereby calculating calibration parameters can be performed on-chip or off-chip.

10. Method as claimed in claim 7, whereby additional signal offsets are provided for calculating more than two temperature points and calibrating the temperature setting curve.

11. The method as claimed in claim 7 wherein the temperature setting curve is calibrated using only a single actual temperature point, where the single actual temperature point represents an actual temperature of the chip.

* * * * *